US011919169B2

(12) United States Patent
Lee et al.

(10) Patent No.: US 11,919,169 B2
(45) Date of Patent: Mar. 5, 2024

(54) OPTIMIZATION OF MOTION PATHS OF A ROBOT USING VISION DATA

(71) Applicant: Google LLC, Mountain View, CA (US)

(72) Inventors: Johnny Lee, Mountain View, CA (US); Stefan Welker, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/753,979

(22) PCT Filed: Nov. 19, 2019

(86) PCT No.: PCT/US2019/062108
§ 371 (c)(1),
(2) Date: Mar. 21, 2022

(87) PCT Pub. No.: WO2021/101514
PCT Pub. Date: May 27, 2021

(65) Prior Publication Data
US 2022/0371195 A1    Nov. 24, 2022

(51) Int. Cl.
*B25J 9/16* (2006.01)
*B25J 13/08* (2006.01)
(Continued)

(52) U.S. Cl.
CPC ........... *B25J 9/1664* (2013.01); *B25J 9/1612* (2013.01); *B25J 9/1697* (2013.01); *B25J 13/08* (2013.01);
(Continued)

(58) Field of Classification Search
CPC ...... B25J 9/1664; B25J 9/1612; B25J 9/1697; B25J 13/08; B25J 13/085; G05B 19/4155;
(Continued)

(56) References Cited

U.S. PATENT DOCUMENTS 9,561,591 B2 *   2/2017   Kim ...................... B25J 9/1664
9,844,877 B1 *   12/2017  Jules ..................... B25J 9/1664
(Continued)

FOREIGN PATENT DOCUMENTS

WO       2016060716 A2     4/2016

OTHER PUBLICATIONS

Written Opinion and International Search Report for corresponding PCT application No. PCT/US2019/062108, dated Jul. 16, 2020.

*Primary Examiner* — Jaime Figueroa
(74) *Attorney, Agent, or Firm* — McDonnell Boehnen Hulbert & Berghoff LLP (57) ABSTRACT

An example computer-implemented method includes receiving, from one or more vision components in an environment, vision data that captures features of the environment, including object features of an object that is located in the environment, and prior to a robot manipulating the object: (i) determining based on the vision data, at least one first adjustment to a programmed trajectory of movement of the robot operating in the environment to perform a task of transporting the object, and (ii) determining based on the object features of the object, at least one second adjustment to the programmed trajectory of movement of the robot operating in the environment to perform the task, and causing the robot to perform the task, in accordance with the at least one first adjustment and the at least one second adjustment to the programmed trajectory of movement of the robot.

21 Claims, 4 Drawing Sheets

(51) Int. Cl.
*G05B 19/4155* (2006.01)
*G06V 20/50* (2022.01)

(52) U.S. Cl.
CPC ........ *B25J 13/085* (2013.01); *G05B 19/4155* (2013.01); *G06V 20/50* (2022.01); *G05B 2219/40269* (2013.01)

(58) Field of Classification Search
CPC ........... G05B 2219/40269; G05B 2219/40105; G05B 2219/40435; G05B 2219/40443; G05B 2219/40512; G05B 2219/40519; G05B 2219/45063; G06V 20/50
USPC ................. 700/245–264; 318/568.11–568.25
See application file for complete search history.

(56) References Cited

U.S. PATENT DOCUMENTS

| | | | |
|---|---|---|---|
| 10,571,902 B2* | 2/2020 | Aldridge | B25J 9/1664 |
| 10,828,778 B2* | 11/2020 | Zhang | B25J 9/163 |
| 11,007,643 B2* | 5/2021 | Diankov | B25J 9/1694 |
| 11,040,447 B2* | 6/2021 | Zak | B25J 15/0616 |
| 2016/0089791 A1 | 3/2016 | Bradski | |
| 2018/0079077 A1* | 3/2018 | Yoon | B25J 13/087 |
| 2018/0101166 A1* | 4/2018 | Aldridge | B25J 9/1671 |
| 2019/0160678 A1* | 5/2019 | Zhang | B25J 9/1664 |
| 2019/0232495 A1* | 8/2019 | Zak | B25J 9/1664 |
| 2020/0039073 A1* | 2/2020 | Diankov | B25J 9/1669 |
| 2020/0122325 A1* | 4/2020 | Iwasa | B25J 9/0081 |
| 2022/0072706 A1* | 3/2022 | Wagner | B25J 9/0093 |

* cited by examiner

OPTIMIZATION OF MOTION PATHS OF A ROBOT USING VISION DATA

CROSS REFERENCE TO RELATED APPLICATION

The present application is the US National Phase under 35 U.S.C. § 371 of International Application PCT/US2019/062108, filed Nov. 19, 2019, which is hereby incorporated by reference in its entirety.

FIELD

The present disclosure relates generally to operation of a robot or a robotic device, and more specifically to, determining adjustments to a programmed trajectory of movement of the robot operating in the environment based on vision data that captures features of the environment, for example.

BACKGROUND

In industrial or commercial settings, a robot is often pre-programmed to repeatedly perform a particular task. For example, a robot can be pre-programmed to repeatedly apply fasteners to particular assembly component(s) in an assembly line. Also, for example, a robot can be pre-programmed to repeatedly grasp and move particular assembly component(s) from a fixed first location to a fixed second location. In grasping an object, a robot can use a grasping end effector such as an "impactive" end effector (e.g., applying force to areas of the object using "claws", or other digits), an "ingressive" end effector (e.g., physically penetrating an object using pins, needles, etc.), an "astrictive" end effector (e.g., using suction or vacuum to pick up an object), and/or one or more "contigutive" end effectors (e.g., using surface tension, freezing, or adhesive to pick up an object).

Such approaches can work well in environments where constrained actions are repeatedly performed on a constrained group of component(s). However, such approaches can fail in environments where a robot is tasked with performing a large variety of actions and/or performing action(s) on a diverse group of components, optionally including new component(s) for which the robots have not been pre-programmed. Moreover, such approaches require significant engineering effort (and associated usage of computational resources) in pre-programming the robot.

For pre-programming the robot, typically, the robot (or a robotic arm) is programmed to move through a series of waypoints at a specified velocity and a specified acceleration according to a profile. Generally, the profile including the waypoints is prepared to minimize a cycle time. The programmed velocity and acceleration are not simply set at maximums, however, because such levels may be dangerous or unstable in certain situations or could cause damage to the object being moved. Thus, the profile is manually generated by a human to change a motion profile between waypoints to minimize time, but for safety, to stay within constraints that are known.

SUMMARY

Implementations disclosed herein relate to methods for determining adjustments to a programmed trajectory of movement of a robot operating in an environment, for example. The methods are computer-implemented methods performed at least in part by computers or computing devices, for example.

Some implementations disclosed herein are additionally or alternatively directed to particular technique(s) for causing the robot to perform a task, in accordance with the adjustments to the programmed trajectory of movement of the robot.

Although some examples are described herein with reference to manipulations that include grasping and/or placing objects, it is understood that techniques described herein can be utilized for a variety of robotic manipulations on objects or for a variety of movements of the robot. For example, techniques can be utilized for a manipulation that includes pushing and/or pulling an object to move it to a different location and/or to mate it with another object. Also, for example, techniques can be utilized for a manipulation that includes grasping a first object, grasping a second object, coupling the first and second object together, and placing the coupled object in a particular location. As yet another example, techniques can be utilized for a manipulation that includes operating on an object with an end effector that includes an etching tool, a screwdriver tool, a cutting tool, and/or other tool(s).

The above description is provided as an overview of some implementations of the present disclosure. Further description of those implementations, and other implementations, are described in more detail below.

Other implementations may include a transitory or non-transitory computer readable medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers or computing devices and/or one or more robots or robotic devices that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein. Thus, the features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods utilize data of an environment of a robot (e.g., including geometry of the object, type of object, scene of the environment, etc.) to change a programmed trajectory of movement of the robot according to optimization parameters. Sensors, such as cameras, are mounted on the robot or within an environment of the robot to capture data of the environment that is used to enable the robot to make decisions of modifications to the programmed trajectory of movement of the robot (e.g., how to make a turn more efficiently). Thus, aspects of the present disclosure provide an improved method and system for operating a robot to transport an object.

The example systems and methods enable improvement of robot motion paths when accomplishing a task. For example, when a robot is fulfilling a certain task, it is possible to progressively optimize motion paths according to optimization parameters (e.g., reduce jerk motions, reduce power consumption, increase speed to reduce cycle time, etc.). To do so, real world robot data is used to accurately simulate power consumption or inertia during dynamic movement.

Sensors on the robot capture a full three-dimensional (3D) scene around the robot to enable decisions to be made in real time for adjustments to movement that will result in safe/unsafe outcomes. The adjustments can include making arc or curved movements rather than straight line movements, for example, that deviate from programmed waypoints. Adjustments can also include changes to acceleration and velocity profiles as well.

Optimization of the motion path of the robot can lead to an increase in efficiency in operation of the robot. Optimization of the motion path can improve efficiency in operation of the robot in terms of speed of completing a task, for example, if the motion path is optimized for time. Optimization of the motion path can also improve efficiency in operation of the robot in terms of energy consumption by the robot. Motion path optimization can also lead to an improved lifetime of the robot, for example, in terms of reducing motor or mechanical wear as well. Still, further optimization can be performed utilizing inputs of the payload and information about the end-effector.

With respect to payload, by using the images captured by the camera, information of the payload can be determined. For example, object detection and object recognition can be performed using camera image analysis, radar, and/or tactile information from the gripper to identify properties of the payload useful for estimating a safe maximal acceleration or maximal jerk it can handle. The information can also be used to estimate a weight of the payload and maximum forces that the payload can tolerate. For example, a one pound ball can be moved differently than a twenty pound ball, both in terms of capabilities of the robot and movement that the ball can handle.

With respect to the end-effector, grippers can be moved and utilized differently than suction cups. Thus, using information of the end-effector in combination with information of the payload enables further optimizations of the pathway to be achieved. As a specific example, for an object including a hammer and an end-effector including a gripper, if the gripper picks up the hammer at the head, movement of the hammer can cause the hammer to swing. Thus, kinematics of motion are affected by placement of the grip on the hammer. This will place constraints on velocity and acceleration of movement of the robot. As a result, for an optimized movement, it may be desirable to grasp the hammer at a center of gravity on the handle so that the robot can achieve a higher acceleration and a higher velocity during movement to decrease a time to perform the task. Consequently, a placement of the gripper and a pose of the object are useful information to be considered for determining adjustments to the pathway and movement along the pathway.

As a result, trajectory optimization including properties of the end effector and a grip/pose of the object are relevant advances as input to consider.

Adjustments can be initially performed using minimal changes within a pre-determined or preset constraint (e.g., within 20 cm of the programmed waypoint), and then machine learning is used to further optimize the movement profile. An iterative technique is useful to optimize toward a goal function. For example, to optimize for time, a reinforcement machine learning algorithm can be used to adjust the movement profile.

The example systems and methods described herein are thus beneficial to improve efficiency of operation of a robot and to reduce execution time for performing a task. Implementations of this disclosure thus provide technological improvements that are particular to computer technology, for example, those concerning computer operation of a robot, analysis of vision data and motion pathways, and autonomous determinations of adjustments to be made to motion pathways.

Figure 1:
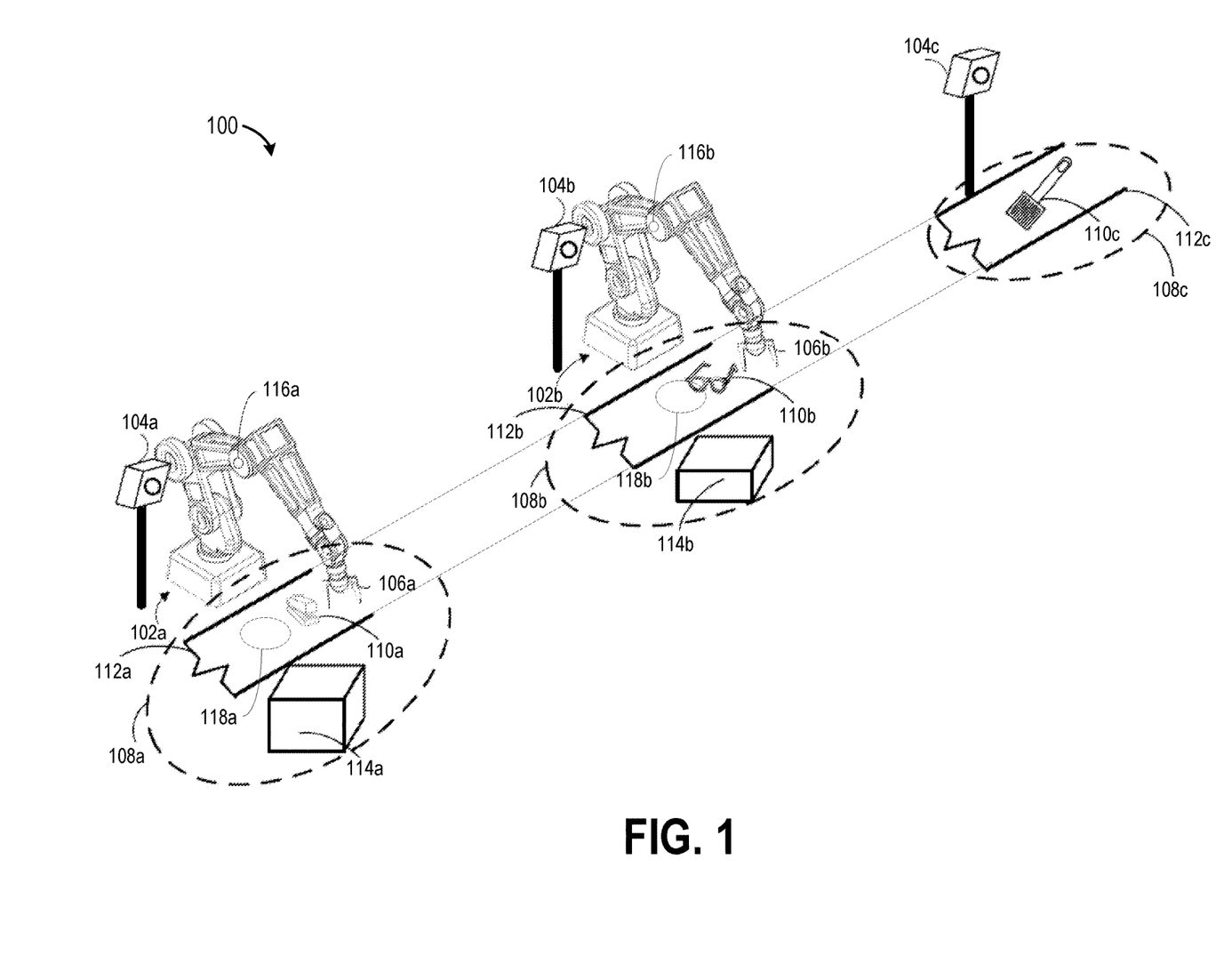
FIG. 1 illustrates an example of an environment in which implementations described herein can be implemented.

Referring now to the figures, FIG. 1 illustrates an example of an environment 100 in which implementations described herein can be implemented. FIG. 1 includes a first robot 102a and a vision component 104a, a second robot 102b and a vision component 104b, and an additional vision component 104c.

The robots 102a and 102b, the vision components 104a and 104b, and the additional vision component 104c are all deployed in the environment 100, such as a manufacturing facility, a packaging facility, or other environment. Although the environment 100 can also include additional robots and/or additional vision components, but only robots 102a and 102b, and the additional vision component 104c, are illustrated in FIG. 1 for simplicity.

The robots 102a and 102b are each a "robot arm" having multiple degrees of freedom to enable traversal of a corresponding grasping end-effector 106a and 106b along any of a plurality of potential paths or trajectories of movement to position the grasping end effector in desired locations. The robots 102a and 102b each further controls two opposed "claws" of their corresponding grasping end-effector 106a and 106b to actuate the claws between at least an open position and a closed position (and/or optionally a plurality of "partially closed" positions). Although these types of robots are illustrated in FIG. 1, additional and/or alternative robots may be utilized, including additional robot arms that are similar to the robots 102a and 102b, robots having other robot arm forms, robots having a humanoid form, robots having an animal form, robots that move via one or more wheels, an unmanned aerial vehicle ("UAV"), and so forth. Also, although particular grasping end effectors are illustrated in FIG. 1, additional and/or alternative end effectors may be utilized (or even no end effectors), such as alternative impactive grasping end effectors (e.g., those with grasping "plates", those with more or fewer "digits"/"claws"), "ingressive" grasping end effectors, "astrictive" grasping end effectors, or "contiguity" grasping end effectors, or non-grasping end effectors (e.g., welding tools, cutting tools, etc.).

The vision components 104a and 104b can be, for example, various vision sensors, such as a monographic camera (e.g., generating 2D RGB images), a stereographic camera (e.g., generating 2.5D RGB images), a laser scanner (e.g., generating 2.5D "point clouds"), and vision data therefrom can be provided to and utilized by corresponding robots 102a and 102b as described herein. Although illustrated adjacent to the robots 102a and 102b in FIG. 1, in other implementations, the vision components 104a and 104b can alternatively be coupled or attached to the robots 102a and 102b (e.g., attached on a portion of an arm or near an end effector).

The additional vision component 104c can be, for example, a monographic camera, a stereographic camera, a laser scanner, and/or other vision component, and can be operatively connected to one or more systems or computing devices (e.g., system 300 or computing device 302) disclosed herein. Optionally, multiple additional vision components can be provided and vision data from each utilized as described herein.

The robot 102a can access a workspace 108a in the environment 100 that, in FIG. 1, includes an object 110a (e.g., stapler) on a conveyor portion 112a of a conveyor system, and also includes a container 114a. The robot 102a can utilize object manipulation parameters, determined as described herein, in grasping the object 110a and placing the object 110a appropriately in the container 114a. More generally, the robot 102a can be operated in the environment 100 to perform a task of transporting the object 110a from a first area (e.g., on the conveyor portion 112a) to a second area (e.g., in the container 114a), for example. Other objects can be on the conveyor portion 112a in the workspace 108a at different times, as can different containers (e.g., the containers can be placed by a separate system or be on a separate conveyor system). For example, as the conveyor system moves, other objects will be transported into the workspace 108a and can be manipulated by the robot 102a while in the workspace 108a. The robot 102a can likewise utilize corresponding object manipulation parameters for picking and placing such objects, and/or performing other manipulations on such objects.

The robot 102b can access a robot workspace 108b in the environment 100 that, in FIG. 1, includes an object 110b (e.g., sunglasses) on a conveyor portion 112b of the conveyor system, and also includes a container 114b. The robot 102b can utilize object manipulation parameters, determined as described herein, in grasping the object 110b and placing it appropriately in the container 114b. More generally, the robot 102b can be operated in the environment 100 to perform a task of transporting the object 110b from a first area (e.g., on the conveyor portion 112b) to a second area (e.g., in the container 114b), for example. Other objects can be on the conveyor portion 112b in the workspace 108b at different times, as can different containers. The robot 102b can likewise utilize corresponding object manipulation parameters for picking and placing such objects, and/or performing other manipulations on such objects.

The additional vision component 104c has a field of view of an area 108c of the environment 100 that is disparate from the workspace 108a and disparate from the workspace 108b. In FIG. 1, the area 108c includes a conveyor portion 112c of the conveyor system, and also includes an object 110c (e.g., a spatula). The area 108c can be "upstream" of the workspace 108a and/or the workspace 108b, in that objects to be manipulated first pass through the area 108c prior to being transported to the workspace 108a or the workspace 108b. For example, the conveyor system can first pass objects through the area 108c before those objects are routed, by the conveyor system, to either the workspace 108a or the workspace 108b. For instance, in FIG. 1, the spatula is in the area 108c, but has not yet been transported to the workspace 108a or the workspace 108b.

As described in detail herein, in various implementations, the vision components 104a and 104b and the additional vision component 104c can each capture vision data that captures features of the environment 100 including object features of the objects 110a-c. Further, the vision data can be utilized, by a system or a computing device (described below), in determining object manipulation parameter(s) for enabling the robot 102a or the robot 102b to manipulate (e.g., pick and place) the objects 110a-c. In addition, the vision data can be utilized to determine at least one first adjustment to a programmed trajectory of movement of the robot 102a and/or 102b operating in the environment 100 to perform a task of transporting the objects 110a-b from the first area to a second area, such that the first adjustment causes movement of the robots 102a-b to reach the objects 110a-b to deviate from the programmed trajectory based on an optimization parameter. Following, the vision data including object features of the objects 110a-b can also be utilized to determine at least one second adjustment to the programmed trajectory of movement of the robots 102a-b operating in the environment 100 to perform the task, and the at least one second adjustment causes movement of the robots 102a-b after manipulating the object to deviate from the programmed trajectory based on the optimization parameter. In these and other manners, the robots 102a and 102b can operate more efficiently, as the object manipulation parameter(s) for manipulating objects can be quickly determined, optionally before the objects even reach the robot workspaces 108a and 108b, and movement of the robots 102a-b can be optimized rather than being rigidly caused to follow a pre-stored programmed trajectory, for example.

The vision data can be utilized to determine the adjustments prior to the robots 102a-b manipulating the objects 110a-b so that optimizations can be generated in advance of movement being initiated.

The environment 100 may also include one or more additional sensors in the environment 100 to provide additional sensor data. The additional sensors may include torque sensors 116a-b of the robots 102a-b or weight sensors 118a-b in the environment 100 positioned underneath the conveyor portions 112a-b. The additional sensor data can be utilized to further determine the second adjustment to the programmed trajectory of movement of the robots 102a-b, for example, based on knowledge of the weight of the objects 110a-b as well as strain on the robots 102a-b.

Figure 2:
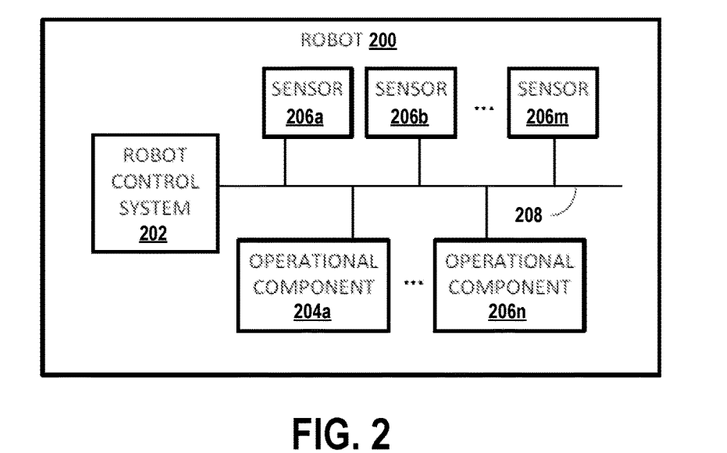
FIG. 2 schematically depicts an example architecture of a robot, according to an example implementation.

FIG. 2 schematically depicts an example architecture of a robot 200, according to an example implementation. The robot 200 may be in a form as shown in FIG. 1 for the robots 102a-b, and the illustration in FIG. 2 is an example block diagram representation of the robots 102a-b, for example. The robot 200 includes a robot control system 202, one or more operational components 204a-n, and one or more sensors 206a-m. The sensors 206a-m may include, for example, vision components, light sensors, pressure sensors, pressure wave sensors (e.g., microphones), proximity sensors, accelerometers, gyroscopes, thermometers, barometers, and so forth. While the sensors 206a-m are depicted as being integral with the robot 200, this is not meant to be limiting. In some implementations, the sensors 206a-m may be located external to the robot 200, e.g., as standalone units.

The operational components 204a-n may include, for example, one or more end effectors and/or one or more servo motors or other actuators to effectuate movement of one or more components of the robot 200. For example, the robot 200 may have multiple degrees of freedom and each of the actuators may control actuation of the robot 200 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 202 may be implemented in one or more processors, such as a CPU, GPU, and/or other controller(s) of the robot 200. In some implementations, the robot 200 may comprise a "brain box" that may include all or aspects of the control system 202. For example, the brain box may provide real time bursts of data to the operational components 204a-n, with each of the real time bursts comprising a set of one or more control commands that dictate, inter alia, the parameters of motion (if any) for each of one or more of the operational components 204a-n. In some implementations, the robot control system 202 may perform one or more aspects of one or more methods described herein.

As described herein, in some implementations all or aspects of the control commands generated by robot control system 202 can be generated based on object manipulation parameter(s) generated according to techniques described herein. Although the robot control system 202 is illustrated in FIG. 2 as an integral part of the robot 200, in some implementations, all or aspects of the robot control system 202 may be implemented in a component that is separate from, but in communication with, the robot 200. For example, all or aspects of the robot control system 202 may be implemented on one or more computing devices that are in wired and/or wireless communication with the robot 200.

In FIG. 2, the robot control system 202, the sensors 202a-m, and the operational components 204a-n are each coupled to a communication bus 208 to enable transfer of data, for example.

Figure 3:
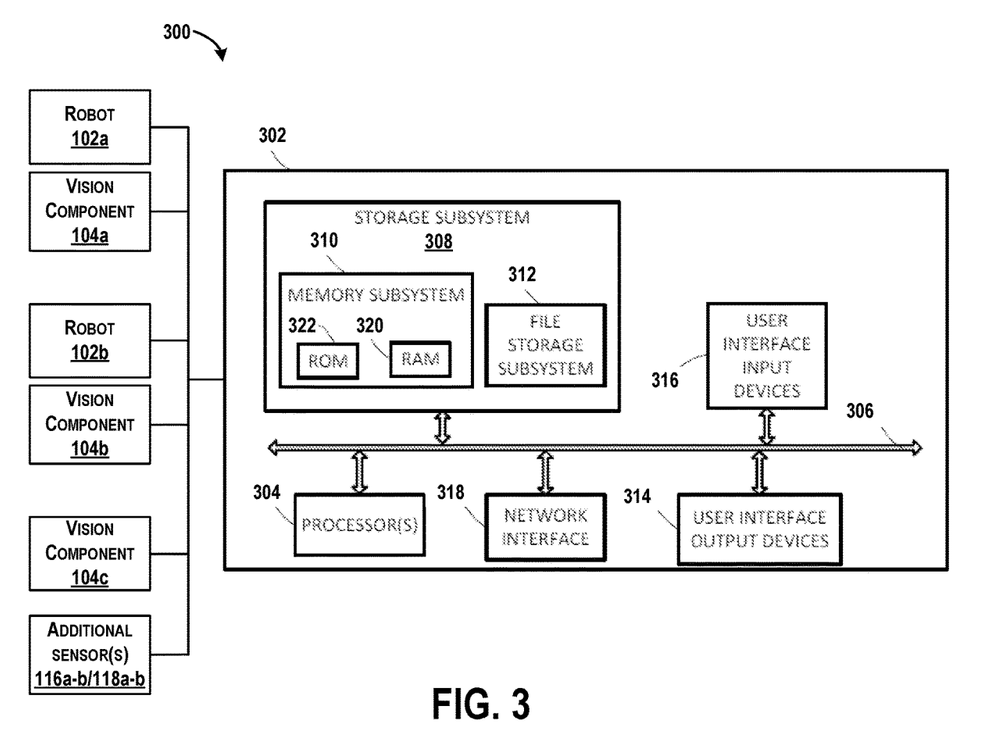
FIG. 3 is a block diagram of an example of a system that may optionally be utilized to perform one or more aspects of techniques described herein, according to an example implementation.

FIG. 3 is a block diagram of an example of a system 300 that may optionally be utilized to perform one or more aspects of techniques described herein, according to an example implementation. The system 300 includes a computing device 302, which may further be utilized to perform one or more aspects of techniques described herein.

The computing device 302 is in communication (e.g., either through wired or wireless communication links) with the robots 102a-b, the vision components 104a-b, the additional vision component 104c, and the additional sensors (e.g., the torque sensors 116a-b and the weight sensors 118a-b) to receive information from or communicate information to these elements.

The computing device 302 includes at least one processor 304 that communicates with a number of peripheral devices via a bus subsystem 306. These peripheral devices may include a storage subsystem 308, including, for example, a memory subsystem 310 and a file storage subsystem 312, user interface output devices 314, user interface input devices 316, and a network interface subsystem 318. The input and output devices allow user interaction with the computing device 302. The network interface subsystem 318 provides an interface to outside networks and is coupled to corresponding interface devices in other computing devices.

The user interface input devices 316 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computing device 302 or onto a communication network.

The user interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computing device 302 to the user or to another machine or computing device.

The user interface input devices 316 and the user interface output devices 314 may more generally also include communication interfaces, such as a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, such communication interfaces may be configured to receive input data from one or more devices, and may also be configured to send output data to other devices.

The processor 304 may be general-purpose processors or special purpose processors (e.g., digital signal processors, application specific integrated circuits, etc.). The processor 304 may receive inputs from the user interface input devices 316, and process the inputs to generate outputs that are stored in the storage subsystem 308. The processor 304 can be configured to execute instructions (e.g., computer-readable program instructions) that are stored in the storage subsystem 308 and are executable to provide the functionality of the computing device 302 described herein.

The storage subsystem 308 stores programming and data constructs that provide the functionality of some or all of the modules described herein. For example, the storage subsystem 308 may include the logic to perform selected aspects of one or more methods described herein. The storage subsystem 308 can include a non-transitory computer readable medium having stored thereon instructions, that when executed by the processors 304 of the computing device 302, cause the computing device 302 to perform functions of the methods described herein.

These software modules are generally executed by the processor 304 alone or in combination with other processors. The memory 310 used in the storage subsystem 308 can include a number of memories including a main random access memory (RAM) 320 for storage of instructions and data during program execution and a read only memory (ROM) 322 in which fixed instructions are stored. The file storage subsystem 312 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 312 in the storage subsystem 308, or in other machines accessible by the processor(s) 304. The storage subsystem 308 may thus include or be considered a non-transitory computer readable medium, for example.

The bus subsystem 306 provides a mechanism for letting the various components and subsystems of the computing device 302 communicate with each other as intended. Although the bus subsystem 306 is shown schematically as a single bus, alternative implementations of the bus subsystem may use multiple busses.

The computing device 302 can be of varying types including a workstation, server, computing cluster, blade server, server farm, or any other data processing system or computing device. Due to the ever-changing nature of computers and networks, the description of the computing device 302 depicted in FIG. 3 is intended only as a specific example for purposes of illustrating some implementations. Many other configurations of the computing device 302 are possible having more or fewer components than the computing device 302 depicted in FIG. 3.

Within examples, the computing device 302 may also be a component of the robot 102a, rather than being separate components.

Figure 4:
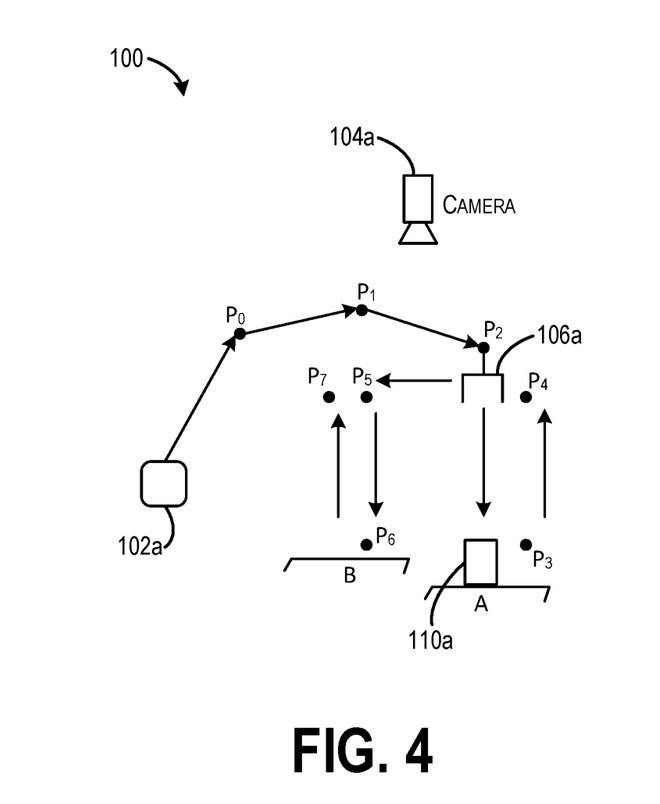
FIG. 4 illustrates an example of the robot in the environment performing a task, according to an example implementation.

FIG. 4 illustrates an example of the robot 102a in the environment 100 performing a task, according to an example implementation. In FIG. 4, the robot 102a is programmed to pick up the object 110a at location A and move the object 110a to location B. To do so, the robot 102a is programmed to move through a series of waypoints going through positions $P_0$ to position $P_1$ to position $P_2$, then lowers the end-effector 106a (e.g., the gripper) to position $P_3$, closes the gripper to grasp the object 110a, raises the gripper to position $P_4$, moves over to position $P_5$, lowers the gripper to position $P_6$, opens the gripper to release the object 110a at location B, raises the gripper to position $P_7$, and then returns to position $P_0$ to complete the task. The waypoints at positions $P_1$ to $P_7$ are a programmed trajectory of movement of the robot 102a. Furthermore, every movement has an associated velocity and acceleration to use for the movement. Each movement through the waypoints requires a start and stop of the gripper.

Within examples, the vision component 104 (e.g., a camera) is included in the environment 100 (or may be mounted on the robot 102a) to capture data of the environment 100 as well as about the object 110a to be moved. The data can be used to determine possible adjustments to make to the path through $P_0$ to $P_7$. Adjustments can also be made according to optimization parameters.

With examples, the computing device 302 can receive, from the vision component 104a in the environment 100, vision data that captures features of the environment 100, including object features of the object 110a that is located in a first area (location A) of the environment 100, and prior to the robot 120a manipulating the object 110a, the computing device 302 can determine two separate adjustments to the programmed trajectory of movement (e.g., the path through $P_0$ to $P_7$) so as to optimize operation of the robot 102a performing the task. First, the computing device 302 can utilize the vision data to determine at least one first adjustment to the programmed trajectory of movement of the robot 102a operating in the environment 100 to perform a task of transporting the object 110a from the first area (location A) to a second area (location B), and the first adjustment causes movement of the robot 102a to reach the object 110a to deviate from the programmed trajectory based on an optimization parameter. Second, the computing device 302 can utilize the object features of the object 110a (generated in response from the vision data) to determine at least one second adjustment to the programmed trajectory of movement of the robot 102a operating in the environment 100 to perform the task, and the at least one second adjustment causes movement of the robot 120a after manipulating the object to deviate from the programmed trajectory based on the optimization parameter. In some examples, the vision data can be processed by the computing device 302 to generate the object features of the object 110a so as to generate or determine information identifying the object 110a including information indicating a size of the object 110a and information indicating an estimated weight of the object 110a, for example. The computing device 302 will then send instructions to the robot 102 to cause the robot 102a to perform the task, in accordance with the at least one first adjustment and the at least one second adjustment to the programmed trajectory of movement of the robot 102a.

Figure 5:
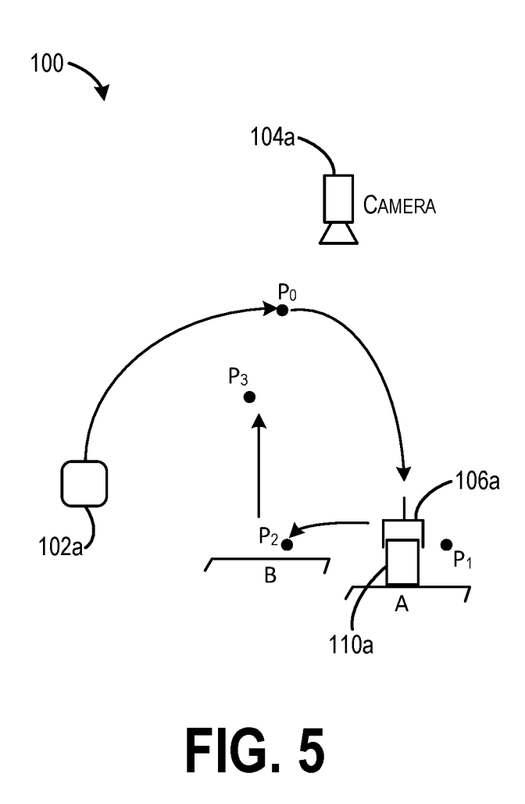
FIG. 5 illustrates an example of the robot in the environment performing the task in an optimized manner, according to an example implementation.

FIG. 5 illustrates an example of the robot 102a in the environment 100 performing the task in an optimized manner, according to an example implementation. In FIG. 5, the path (e.g., the path through $P_0$ to $P_7$) has been reduced to four waypoints ($P_0$ to $P_3$) and movement between the waypoints is performed in an arc trajectory rather than straight line movements as shown in FIG. 4. Following the path ($P_0$ to $P_3$) in FIG. 5 reduces a time to complete the task, for example. Thus, the pathway ($P_0$ to $P_3$) is optimized, and further movement changes can be made for additional optimizations such as a velocity of movement of the robot 102a along the waypoints can be adjusted as well. Using the information from the vision component 104a, it can be determined if a path from $P_0$ to $P_1$ is free of any obstacles, then a velocity of the robot 102a can be increased due to no safety concerns or waypoints can also be removed to cause the robot 102a to move directly to the box.

Many optimization parameters can be chosen as constraints for making adjustments to the programed pathway. Furthermore, multiple optimization parameters may be used as well. Example optimization parameters include (i) time, (ii) power, and (iii) robot life. Time refers to how long it takes to perform a task, which can be based on the pathway taken as well as velocity and acceleration of the robot 102a along the pathway. Power refers to how much energy is needed to perform the task. Robot life refers to a lifetime of motors, actuators, or other components of the robot 102a, and optimization based on robot life makes adjustments to a movement profile in a way that maximizes a function of the motors, for example, to distribute motions across multiple motors to carry a load more evenly.

In FIG. 5, for example, an example optimization parameter implemented is time, and adjustments are initially made at intermediate waypoints, perhaps up to a 20 cm deviation, to round out the pathway between positions $P_1$ and $P_2$ (in FIG. 4) to an arc from positions $P_0$ to $P_1$, for example. Further adjustments can be made to the pathway to remove the down, up, left, etc. motions and replace with arcs, as shown in FIG. 5. Thus, when doing so, original waypoints $P_0$, $P_2$, $P_4$, and $P_5$ as shown in FIG. 4 are removed, and new position waypoints $P_0$ to $P_3$ remain.

The adjustments to the programmed trajectory of movement of the robot 102a are determined (and calculated) in real-time, by the computing device 302, as the robot 102a is following or starting to follow the programmed trajectory of movement but has yet to begin manipulating the object 110a, for example.

The adjustments to the programmed trajectory of movement of the robot 102a can include a change to a velocity of movement of the robot 102a along the programmed trajectory of movement, a change to an acceleration of movement of the robot 102a along the programmed trajectory of movement, removing one of the plurality of waypoints along the programmed trajectory of movement, a change to a position of one of the waypoints (e.g., modifying a straight line to an arc movement), or any combination such as removing at least one of the plurality of waypoints and adjusting at least one of the substantially straight lines to be an arc to reduce start and stop movement of the robot 102a.

In examples where additional sensor data is available from the torque sensors 116a-b, the weight sensors 118a-b, or other sensors, the computing device 302 can utilize the additional sensor data to further determine the at least one second adjustment to the programmed trajectory of movement of the robot 102a. For example, prior to the robot 102a manipulating the object, object manipulation parameters for manipulating the object 110a by the robot 102a can be determined once a weight of the object 110 is known. For objects over a threshold weight, the robot 102a may have limitations on how fast the robot 102a can move the object.

Such object manipulation parameters can also include a grasp pose for grasping of the object 110a, and the computing device 302 can utilize the vision data to determine the pose of the object 110a on the conveyor portions 112a, and then cause the end-effector 106a of the robot 102a to traverse to the grasp pose, and attempt a grasp of the object 110a after traversing to the grasp pose to manipulate the object 110a, in accordance with the one or more object manipulation parameters. Thus, the object 110a in FIG. 1 is a stapler, and if the stapler is positioned as shown (e.g., laterally along the conveyor portion 112a), then the robot 102a has an opportunity to grasp both sides of the stapler and can do so as the stapler moves along the conveyor portion 112a. If the stapler was positioned, for example, in a diagonal pose, the robot 102a may need to rotate the end-effector 106 to match the pose of the stapler. The vision data thus includes a 3D representation of the environment 100 and enables determination of a geometry of the end-effector and position of surfaces of the object 110a such that the computing device 302 can determine an approach to the object 110a from other angles, for example. Thus, such object manipulation parameters can be determined by the computing device 302 utilizing the vision data.

Thus, prior to the robot 102a manipulating the object 110a, the computing device 302 can determine, based on the vision data and on a type of end-effector 106a of the robot 102a, one or more object manipulation parameters for manipulating the object 110a by the robot 102a. In some examples, it may be efficient to place the end-effector 106a to grasp an approximate center of gravity of the object 110a.

Moreover, after the robot 102a manipulates the object 110a (e.g., attempts to grasp or begins to grasp the object), the robot 102a may include a sensor on the end-effector 106a to determine tactile properties of the object 110a captured. Then, the computing device 302 can determine, based on the tactile properties of the object, at least one third adjustment to the programmed trajectory of movement of the robot 102a operating in the environment 100 to perform the task.

Figure 6:
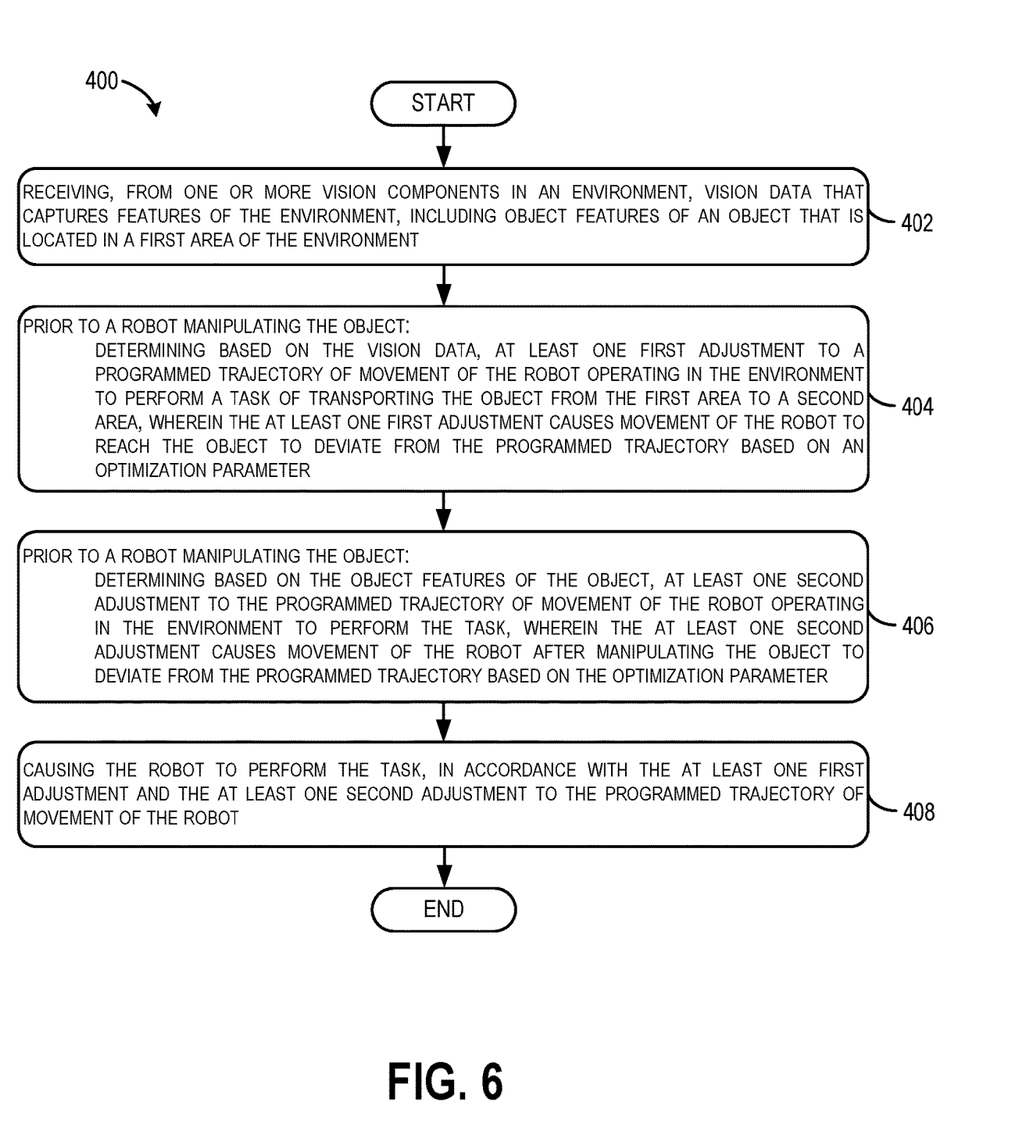
FIG. 6 shows a flowchart of another example of a computer-implemented method, according to an example implementation.

FIG. 6 shows a flowchart of another example of a computer-implemented method 400, according to an example implementation. Method 400 shown in FIG. 6 presents an example of a method that could be used with the robots 102a-b, robot 200, system 300, or computing device 302 shown in FIGS. 1-3, for example. Further, devices or systems may be used or configured to perform logical functions presented in FIG. 6. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes receiving, from one or more vision components in an environment, vision data that captures features of the environment, including object features of an object that is located in a first area of the environment. This can include receiving the vision data from the one or more vision components attached to the robot, for example. Within examples, the object features of the object include receiving information identifying the object, information indicating a size of the object, and information indicating an estimated weight of the object.

At block 404, the method 400 includes, prior to a robot manipulating the object, determining based on the vision data, at least one first adjustment to a programmed trajectory of movement of the robot operating in the environment to perform a task of transporting the object from the first area to a second area, and the at least one first adjustment causes movement of the robot to reach the object to deviate from the programmed trajectory based on an optimization parameter.

Within examples, the optimization parameter includes one or more of (i) power, (ii) time, and (iii) robot life.

The first adjustment to the programmed trajectory of movement of the robot 102*a* may be determined in real-time as the robot is following the programmed trajectory of movement, and can include examples of determining a change to a velocity of movement of the robot 102*a* along the programmed trajectory of movement, determining a change to an acceleration of movement of the robot 102*a* along the programmed trajectory of movement, determining a change to a position of one of the waypoints along the programmed trajectory, removing one of the plurality of waypoints, and removing at least one of the plurality of waypoints and adjusting at least one of the substantially straight lines to be an arc to reduce start and stop movement of the robot. The first adjustment can be any one or combination of these examples described above.

The motion pathway has been described as having waypoints, and a specific velocity and acceleration may be associated with each waypoint, for example. Thus, adjustments to velocity and acceleration from waypoints $P_0$ to $P_1$ can be determined while no adjustments are made to the velocity and acceleration along other portions of the pathway. In some instances, it may be desirable to avoid the robot 102*a* making a stop at each waypoint to reduce time to complete the task as well.

At block 406, the method 400 includes, prior to a robot manipulating the object, determining based on the object features of the object, at least one second adjustment to the programmed trajectory of movement of the robot operating in the environment to perform the task, and the at least one second adjustment causes movement of the robot after manipulating the object to deviate from the programmed trajectory based on the optimization parameter. In some examples, the computing device 302 can receive, from one or more additional sensors in the environment, additional sensor data that includes a torque sensor of the robot or a weight sensor in the environment, and can determine the at least one second adjustment to the programmed trajectory of movement of the robot based on the additional sensor data.

At block 408, the method 400 includes, causing the robot to perform the task, in accordance with the at least one first adjustment and the at least one second adjustment to the programmed trajectory of movement of the robot.

Within examples, prior to the robot manipulating the object, the computing device 302 further determines, based on the vision data, one or more object manipulation parameters for manipulating the object by the robot. The one or more object manipulation parameters can include a grasp pose for grasping of the object, and the computing device 302 can cause an end effector of the robot to traverse to the grasp pose, and attempt a grasp of the object after traversing to the grasp pose to manipulate the object, in accordance with the one or more object manipulation parameters.

In other examples, prior to the robot manipulating the object, the computing device 302 can determine, based on the vision data and on a type of end-effector of the robot, one or more object manipulation parameters for manipulating the object by the robot. Following, based on a pose of the object, the computing device 302 can determine the one or more object manipulation parameters including a grasp to use for the object and a placement of the end-effector to grasp an approximate center of gravity of the object.

In still further examples, the computing device 302 can determine tactile properties of the object captured after the robot manipulating the object, and determine based on the tactile properties of the object, at least one third adjustment to the programmed trajectory of movement of the robot operating in the environment to perform the task.

As such, within any examples above, information on payload (e.g., the object 110*a*) and information on end-effector/gripper of the robot 102*a* can be utilized to enable further adjustments to be determined to the preprogrammed trajectory. As a specific example, for an object including a sponge, which is lightweight and can be manipulated without much concern of damage to the object, the robot may move relatively fast along the pathway. However, for an object including a large bag of dirt, this may not be the case. The vision data enables object recognition and detection by the computing device (e.g., either performed locally or via access to a network) to determine properties of the payload to estimate safe maximal acceleration or maximal jerk it can handle. The same computations can be made with respect to estimated weights of an object and estimated maximum forces that an object can tolerate. Specifically, for example, a one pound ball can be moved by the robot at a force and acceleration that is much higher than moving a twenty pound ball.

With respect to examples for the end-effector, different velocities and acceleration are possible when the end-effector is a suction cup versus a gripper, for example. Further, grasps of objects can determine possible adjustments that can be made too. As a specific example, if the object is a hammer, and if the end-effector grasps the hammer at the top, movement of the hammer can cause the hammer to swing and possibly become unstable. However, if the end-effector grasps an approximate center of gravity (e.g., along a handle), movement can be made with more control. Further, if grasped in a center of gravity, can accelerate even more. The manner in which the object is grasped can provide a more kinematically positive manner to perform higher accelerations even with smaller grippers.

The adjustments to the programmed trajectory of movement of the robot are further determined by the computing device 302 constrained by capabilities of the robot. The capabilities of the robot can include maximum speeds, torques, accelerations, etc., when handling objects of various weights.

Using the method 400 enables the computing device 302 to progressively optimize pre-programmed motion paths when accomplishing a task according to certain optimization parameters. Many optimization parameters have been described, and still others can include, for example, to reduce jerk or shake motion and to reduce power consumption. By utilizing vision data, the computing device 302 can determine the adjustments to the pre-programmed trajectories in a real world environment and in real time.

Optimizations parameters are utilized, rather than setting speeds and accelerations to a maximum amount for a reduction in time, for example, because some speeds, accelerations, or modified pathways may not be stable or could cause damage to the object 110a.

Within any of the examples described herein, adjustments to the preprogrammed trajectory may be limited to a maximum amount of allowed variations in certain parameters for these trajectories. For example, the adjustments may be allowed only up to about or within a change of 10-20 cm, or within a range of about 20 cm-50 cm when no obstacles are detected in a surrounding area. As other examples, adjustments to speeds may be allowed up to changes of 2 m/s or up to 5 m/s in some instances.

Still further, within any of the examples described herein the computing device 302 may iteratively adjust the change to the position of one of the waypoints based on the optimization parameter for continued improvements to achieve an optimization goal. Iterative adjustments can be made with further changes occurring at subsequent waypoints of the pathway, or iteratively such that further adjustments are made in subsequent performances of the task.

Iterative adjustments can include using prior motion paths as training instances (e.g., based on vision data, manipulation parameters, a corresponding success measure of reducing time or power consumption more than a threshold) for utilization by a training engine in training one or more of machine learning models. A training engine trains the machine learning models utilizing the corresponding training instances. A trained machine learning model can then be at least selectively utilized by the computing device 302 in predicting one or more corresponding object manipulation parameters or one or more adjustments to the preprogrammed path that are then at least selectively utilized in controlling the robot(s). In some implementations, a trained machine learning model is only utilized after the training engine determines one or more conditions are satisfied. The one or more conditions can include, for example, at least a threshold amount of training and/or validation of the trained machine learning model as described herein.

Thus, the machine learning model can thus operate according to machine learning tasks as classified into several categories. In supervised learning, the machine learning algorithm builds a mathematical model from a set of data that contains both the inputs and the desired outputs. The set of data is sample data known as "training data", in order to make predictions or decisions without being explicitly programmed to perform the task. For example, for determining adjustments to speed, the training data for a supervised learning algorithm would include limits of the robot for various speeds and while holding various objects.

In another category referred to as semi-supervised learning, the machine learning algorithm develops mathematical models from incomplete training data, where a portion of the sample input does not have labels or associated limits. A classification algorithm can then be used when the outputs are restricted to a limited set of values.

In another category referred to as unsupervised learning, the machine learning algorithm builds a mathematical model from a set of data that contains only inputs and no desired output labels. Unsupervised learning algorithms are used to find structure or discover patterns in adjustments to pathways that result in successful changes.

Thus, machine learning can be utilized to optimize adjustments that are being made to the motion pathways.

Still further, robotic simulators can be utilized to simulate all or parts of the robot and/or all or parts of the workspace, and can render a simulation of the object being moved by the robot with adjustments to the preprogrammed trajectory. The robotic simulator can be used to simulate an environment that includes corresponding object(s), to simulate all or parts of a robot (e.g., at least end effector(s) of the robot) operating in the simulated environment, and to optionally simulate interactions between the simulated robot and the simulated environmental objects in response to simulated robotic actions. Various simulators can be utilized, such as physics engines that simulate collision detection, soft and rigid body dynamics, etc. One non-limiting example of such a simulator is the BULLET physics engine.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A computer-implemented method comprising:
   receiving, from one or more vision components in an environment, vision data that captures features of the environment, including object features of an object that is located in a first area of the environment;
   prior to a robot manipulating the object:
   determining based on the vision data, at least one first adjustment to a programmed trajectory of movement of the robot operating in the environment to perform a task of transporting the object from the first area to a second area, wherein the programmed trajectory of movement of the robot comprises a plurality of waypoints with movement between the plurality of waypoints along substantially straight lines, wherein determining the at least one first adjustment to the programmed trajectory of movement of the robot involves removing at least one of the plurality of waypoints and adjusting at least one of the substantially straight lines to a non-straight line, and wherein the at least one first adjustment causes movement of the robot to reach the object to deviate from the programmed trajectory based on an optimization parameter;

determining based on the object features of the object, at least one second adjustment to the programmed trajectory of movement of the robot operating in the environment to perform the task, wherein the at least one second adjustment causes movement of the robot after manipulating the object to deviate from the programmed trajectory based on the optimization parameter; and causing the robot to perform the task, in accordance with the at least one first adjustment and the at least one second adjustment to the programmed trajectory of movement of the robot.

2. The method of claim 1, wherein receiving, from the one or more vision components in the environment, the vision data comprises:

receiving the vision data from the one or more vision components attached to the robot.

3. The method of claim 1, wherein receiving object features of the object comprises:

receiving information identifying the object, information indicating a size of the object, and information indicating an estimated weight of the object.

4. The method of claim 1, wherein determining the at least one first adjustment to the programmed trajectory of movement of the robot operating in the environment to perform the task comprises:

determining the at least one first adjustment in real-time as the robot is following the programmed trajectory of movement.

5. The method of claim 1, wherein determining the at least one first adjustment to the programmed trajectory of movement of the robot comprises:

determining a change to a velocity of movement of the robot along the programmed trajectory of movement.

6. The method of claim 1, wherein determining the at least one first adjustment to the programmed trajectory of movement of the robot comprises:

determining a change to an acceleration of movement of the robot along the programmed trajectory of movement.

7. The method of claim 1, wherein the programmed trajectory of movement of the robot comprises a plurality of waypoints, and wherein determining the at least one first adjustment to the programmed trajectory of movement of the robot comprises:

determining a change to a position of one of the waypoints.

8. The method of claim 7, further comprising:

iteratively adjusting the change to the position of one of the waypoints based on the optimization parameter for continued improvements to achieve an optimization goal.

9. The method of claim 1, further comprising:

receiving, from one or more additional sensors in the environment, additional sensor data, wherein the one or more additional sensors comprise a torque sensor of the robot or a weight sensor in the environment; and wherein determining the at least one second adjustment to the programmed trajectory of movement of the robot comprises determining the at least one second adjustment based on the additional sensor data.

10. The method of claim 1, further comprising, prior to the robot manipulating the object:

determining, based on the vision data, one or more object manipulation parameters for manipulating the object by the robot.

11. The method of claim 10, wherein the one or more object manipulation parameters include a grasp pose for grasping of the object, and the method further comprises:

causing an end effector of the robot to traverse to the grasp pose, and attempt a grasp of the object after traversing to the grasp pose to manipulate the object, in accordance with the one or more object manipulation parameters.

12. The method of claim 1, further comprising, prior to the robot manipulating the object:

determining, based on the vision data and on a type of end-effector of the robot, one or more object manipulation parameters for manipulating the object by the robot.

13. The method of claim 12, further comprising:

determining, based on a pose of the object, the one or more object manipulation parameters including a grasp to use for the object and a placement of the end-effector to grasp an approximate center of gravity of the object.

14. The method of claim 1, wherein the optimization parameter includes one or more of (i) power, (ii) time, and (iii) robot life.

15. The method of claim 1, further comprising:

determining tactile properties of the object captured based on the robot manipulating the object; and determining, based on the tactile properties of the object, at least one third adjustment to the programmed trajectory of movement of the robot operating in the environment to perform the task.

16. The method of claim 1, wherein determining the at least one first adjustment to the programmed trajectory of movement of the robot and determining the at least one second adjustment to the programmed trajectory of movement of the robot comprises:

determining respective adjustments constrained by capabilities of the robot.

17. A non-transitory computer readable medium having stored thereon instructions, that when executed by one or more processors of a computing device, cause the computing device to perform functions comprising:

receiving, from one or more vision components in an environment, vision data that captures features of the environment, including object features of an object that is located in a first area of the environment;

prior to a robot manipulating the object:

determining based on the vision data, at least one first adjustment to a programmed trajectory of movement of the robot operating in the environment to perform a task of transporting the object from the first area to a second area, wherein the programmed trajectory of movement of the robot comprises a plurality of waypoints with movement between the plurality of waypoints along substantially straight lines, wherein determining the at least one first adjustment to the programmed trajectory of movement of the robot involves removing at least one of the plurality of waypoints and adjusting at least one of the substantially straight lines to a non-straight line, and wherein the at least one first adjustment causes movement of the robot to reach the object to deviate from the programmed trajectory based on an optimization parameter;

determining based on the object features of the object, at least one second adjustment to the programmed trajectory of movement of the robot operating in the environment to perform the task, wherein the at least one second adjustment causes movement of the robot after manipulating the object to deviate from the programmed trajectory based on the optimization parameter; and causing the robot to perform the task, in accordance with the at least one first adjustment and the at least one second adjustment to the programmed trajectory of movement of the robot.

18. The non-transitory computer readable medium of claim 17, wherein the functions further comprise:

determining tactile properties of the object captured after the robot manipulates the object; and determining, based on the tactile properties of the object, at least one third adjustment to the programmed trajectory of movement of the robot operating in the environment to perform the task.

19. A system comprising:

one or more processors; and non-transitory data storage storing instructions, that when executed by the one or more processors, causes the one or more processors to perform functions comprising:

receiving, from one or more vision components in an environment, vision data that captures features of the environment, including object features of an object that is located in a first area of the environment;

prior to a robot manipulating the object:

determining based on the vision data, at least one first adjustment to a programmed trajectory of movement of the robot operating in the environment to perform a task of transporting the object from the first area to a second area, wherein the programmed trajectory of movement of the robot comprises a plurality of waypoints with movement between the plurality of waypoints along substantially straight lines, wherein determining the at least one first adjustment to the programmed trajectory of movement of the robot involves removing at least one of the plurality of waypoints and adjusting at least one of the substantially straight lines to a non-straight line, and wherein the at least one first adjustment causes movement of the robot to reach the object to deviate from the programmed trajectory based on an optimization parameter;

determining based on the object features of the object, at least one second adjustment to the programmed trajectory of movement of the robot operating in the environment to perform the task, wherein the at least one second adjustment causes movement of the robot after manipulating the object to deviate from the programmed trajectory based on the optimization parameter; and causing the robot to perform the task, in accordance with the at least one first adjustment and the at least one second adjustment to the programmed trajectory of movement of the robot.

20. The system of claim 19, wherein the functions further comprise, prior to the robot manipulating the object:

determining, based on the vision data and on a type of end-effector of the robot, one or more object manipulation parameters for manipulating the object by the robot.

21. The system of claim 20, wherein the functions further comprise:

determining, based on a pose of the object, the one or more object manipulation parameters including a grasp to use for the object and a placement of the end-effector to grasp an approximate center of gravity of the object.

* * * * *